May 27, 1930. W. M. DILLON Re. 17,685

STRAINER

Original Filed Oct. 23, 1925

Inventor

Wallace M. Dillon

By P. A. Blair,

Attorney

Reissued May 27, 1930 Re. 17,685

UNITED STATES PATENT OFFICE

WALLACE M. DILLON, OF WASHINGTON, DISTRICT OF COLUMBIA

STRAINER

Original No. 1,665,494, dated April 10, 1928, Serial No. 64,319, filed October 23, 1925. Application for reissue filed February 17, 1930. Serial No. 429,160.

This invention relates to improvements in strainers and more particularly to a type especially adapted for filtering gasoline or the like where it is desired to remove all particles of sediment and water.

One of the objects of the present invention is to provide a simple and practical strainer comprising relatively few parts which may be inexpensively manufactured and assembled.

A further object is to provide a portable strainer of the above general character which may be easily taken apart for cleaning and whereby the interior parts may be removed permitting the outer portion to be used as a container or funnel.

A further object is to provide a strainer of the above general character which will be strong and durable and not require the frequent replacement of parts as with strainers now in general use, for example, by actual test it has been proven that the time consumed in refueling an airplane with this improved filter has been reduced to one-third of the time required with the use of the commonly used chamois skin filter. The use of chamois skin not only makes refueling a long and tedious task, requiring time and patience, but causes the increased hazard of fire by the constant danger of the generation of static electricity. The chamois skin soon becomes hardened and thereby loses its effectiveness and necessitates constant renewal.

Other objects will be in part obvious and in part hereinafter pointed out in connection with the accompanying sheet of drawings illustrating one of various embodiments of the invention and in the several views of which corresponding parts are indicated by similar reference characters.

In these drawings.

Figure 1:
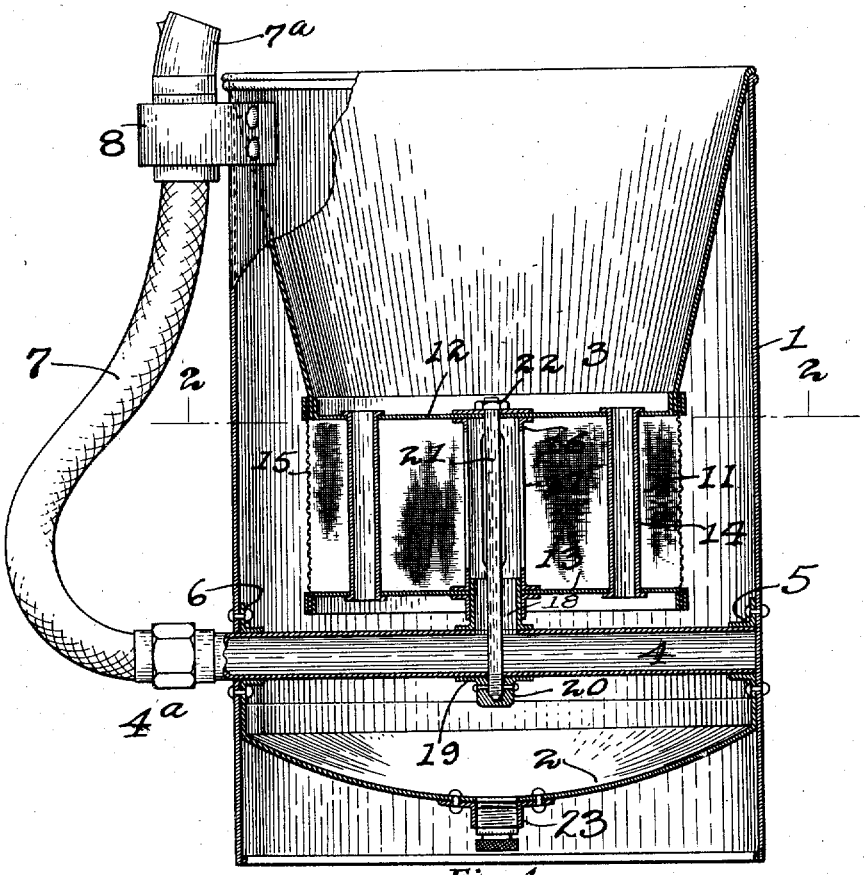
Figure 1 is a vertical longitudinal section of the device embodying features of the present invention.
Figure 2:
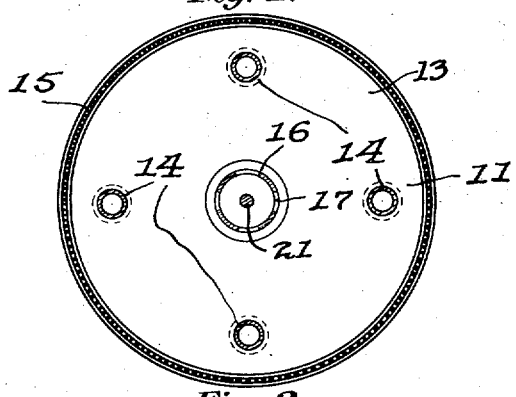
Figure 2 is a sectional view taken substantially on the line 2—2 of Figure 1.

Referring now to the drawings in detail and more particularly to Figure 1, the embodiments hereinafter described comprise preferably a cylindrical outer container 1 having a concave bottom 2 provided with a removable drain plug 23 for the purpose of removing the accumulation of water and sediment when it is not desired to take the device apart for complete cleaning.

It will be noted that when the interior portions are removed as well as the plug 23 the container 1 may be used as a funnel.

Located near the lower part of the outer container 1 and several inches above the bottom 2 is positioned an outlet pipe 4 secured to the sides of the container 1 preferably by means of flanged bearing members 5 and 6 which form a support for the inner filter member 3 hereinafter described. The pipe 4 projects inwardly through one side wall of the container and has secured by means of a coupling 4ª a flexible hose member 7 for the purpose of more conveniently directing the flow of gasoline or the fluid to be filtered into its receptacle.

When the hose member 7 is not in use, it may be secured in the position shown by means of spring 8 engaging the lower end of nozzle 7ª.

The inner hopper member 3 is preferably of frusto-conical shape and terminates in a cylindrical wire filter screen member 11 secured to its lower portion. This screen member 11 is composed of two spaced apart circular flanged plates 12 and 13 held in spaced relation by a plurality of tubes 14 through which the gasoline freely passes from the hopper 3 to the space between the inner walls of the container and the filter screen 15. The tubes 14, it will be noted are preferably flanged and soldered in place to provide a strong and durable construction.

The filter screen 15 is preferably made of very fine mesh bronze screen of a size approximating 200 thereby to eliminate the passage of water or sediment to the interior of the tank.

In the center of the lower circular plate 13 is an aperture surrounded by a circular flange wheel 16 provided with elongated slots 17 for permitting the free passage of gasoline from the interior of the screen 15 out through the central aperture in the plate 13. The fitting 18 associated with the protruding sleeve 19 cooperates with this aperture for directing the flow of gasoline into the outlet pipe 4. The lower part 19 of this fitting is provided with a boss 20 for the support of a threaded rod 21 which passes through the upper plate 12 and is threaded at its upper end for the reception of a nut 22. This nut when screwed down securely holds the internal parts of the filter in operative relation and on removal the filter may be bodily removed from the container 1 for the purpose of cleaning or using the receptacle 1 as a funnel or container.

It is believed that the operation of this device will be clear from the above.

It may be stated, however, that the unfiltered gasoline is poured into the hopper 3 and passes down through the tubes 14 thus allowing the water and sediment to collect in the concave bottom 2. The gasoline then passes in through the screen 15 and is thus thoroughly filtered and cleaned before passing out through the slot 17 to the outlet pipe 4 and nozzle 7[a]. At intervals the block 23 is removed for the purpose of removing water and sediment. When a thorough over-hauling is desired, the nut 22 is removed permitting all of the parts above the outlet pipe 4 to be removed.

It will thus be seen that the present invention provides a simple and practical filter, reliable and efficient in operation, inexpensive to manufacture, durable in construction and well adapted to accomplish, among others, all of the objects and advantages herein set forth.

What I claim is:

1. In a gasoline strainer of the character described and in combination, an outer container, a hopper, a member attached to the hopper, the side wall thereof being a filter and well above the bottom of the container, means extending through the horizontal plane of the member longitudinally of the container for conducting an entering fluid from the hopper to the bottom of the container below the filtering wall, means for conducting the fluid to the exterior of the container after it has passed through the filtering wall into said member, and means connecting the conducting means with the filtering member.

2. In a portable strainer of the character described and in combination, a container having a chamber, a hopper provided with a wall closing the upper end of said chamber, a vertically disposed filter screen of drumlike construction having a central outlet communicating with the exterior of the container for taking off filtered fluid which passes into the drum through the screen, and vertical conduits extending from the hopper through the filter or strainer for conducting a fluid therethrough and below the filter screen prior to its passing into the drum and being filtered by the vertical screen, whereby the fluid may rise upwardly to the screen.

3. In combination, a container, a cylindrical filter member disposed substantially centrally in said container and having a top and bottom closing the interior of the member from the container and a filtering side wall, conduits extending through said member for conveying an entering fluid through the member prior to its being filtered, and an outlet from the interior of said strainer below the filter screen to the exterior of the container, said container being provided at its lower part with a normally closed opening for permitting the removal of sediment or water as and when desired.

4. In a strainer, an outer container, a hopper, a member attached to the hopper and disposed substantially centrally in the container, the side wall of said member being perforate well above the bottom of the container to form a filter substantially uniformly surrounded by the container area, means extending through the member longitudinally of the container for conducting an entering fluid from the hopper to the container below said filtering wall, means for conducting the fluid to the exterior of the container from the interior of said member after it is passed into the latter through the filtering wall and means for taking off filtered fluid from the bottom of said member.

5. In a strainer of the character described and in combination, a container, a vertically disposed filter screen of drumlike construction having an outlet from its interior communicating with the exterior of the container, and vertical conduits extending through the filter screen drum for conducting a fluid through and below the filter screen prior to its engaging the filter screen and passing into the interior thereof and being filtered, whereby the fluid rises upwardly around the vertical screen before passing therethrough into the interior of the drum from the outside thereof.

6. In combination, a container, a filter member in said container having a top and bottom closing the member from the container and a filtering side wall, said filtering member being substantially smaller than the container and having its side wall located therein well above the container bottom, a plurality of separate conduits extending through said member for conveying an entering fluid through the member prior to its being filtered and before it reaches the filtering wall, and an outlet from the interior of said member through its bottom to the exterior of the container.

7. A strainer comprising a container having a chamber provided with a normally closed bottom, a hopper at the upper end of said chamber, a filter member in said chamber spaced above said bottom and having a filtering wall, a conduit of substantially less area than said chamber leading from the hopper at the upper end of said container into the chamber, said conduit being adapted to direct fluid from the hopper above the filter member through the horizontal plane thereof into the chamber below the filtering wall while excluding the same from the filtering wall, said chamber opening upwardly around said filtering wall to permit the fluid to rise upwardly around the filtering wall and then pass therethrough, and means for taking off filtered fluid from the interior of the filtering member below the horizontal planes of entry of the liquid thereinto through the filtering wall.

8. A strainer comprising a container having a chamber provided with a normally closed bottom, a hopper at the upper end of said chamber closing the top thereof, a filter member in said chamber spaced above said bottom and having a filtered side wall, a conduit of substantially less area than said chamber leading from the hopper at the upper end of said container into the chamber, said conduit being adapted to direct fluid from above the filter member through the horizontal plane thereof while excluding the same from the filtering wall, said chamber opening upwardly around said filtering side wall to permit the fluid to pass upwardly around said wall, and means for taking off filtered fluid from the interior of the filtering member below the filtering wall.

9. A strainer comprising a container having a chamber provided with a normally closed bottom, a hopper at the upper end of said chamber closing the top of the same, a filter member in said chamber spaced above said bottom and having a filtering wall, a plurality of conduits each of substantially less area than said chamber leading from the hopper at the upper end of said container into the chamber and opening in the latter below the filter member, said conduits being adapted to direct entering fluid from above the filter member through the horizontal plane thereof while excluding the same from the filtering wall thereof, said chamber opening upwardly around said filtering wall to permit the entering fluid to pass upwardly around said wall after leaving said conduits, and means for taking off filtered fluid from the interior of the filtering member at its bottom.

10. A strainer comprising a container having a chamber provided with a normally closed bottom, a hopper at the upper end of the chamber having a wall closing the top of the chamber, a filter member in said chamber spaced above said bottom and having a filtering side wall, a plurality of conduits each of substantially less area than said chamber leading from the hopper at the upper end of said container into the chamber and opening into the latter below the filter member, said conduits being adapted to direct fluid from above the filter member through the horizontal plane thereof while excluding the same from the filtering wall thereof, said chamber opening upwardly around said filtering side wall and extending above the filtering member around the hopper whereby to permit the fluid to pass upwardly around and above the said wall after leaving the conduits, and means for taking off filtered fluid from the interior of the filtering member.

11. In a strainer, a container having a chamber, a hopper at the upper end of the chamber, a filtering member in said chamber formed with a filtering wall extending longitudinally of the chamber spaced substantially above the bottom of said chamber, said wall separating the interior of the filtering member from the chamber, a conduit for conducting fluid from the hopper above the filtering member to the chamber below the filtering wall while excluding the fluid from the filtering wall, said conduit being of substantially less area than the chamber, and means for taking off filtered fluid from the interior of said filtering member.

12. In a strainer, a container having a chamber, a filtering member in said chamber formed with a filtering wall extending longitudinally of the chamber and spaced substantially above the bottom of said chamber, said wall being surrounded by the chamber and separating the interior of the filtering member from the chamber, the filtering member having top and bottom walls closing the interior thereof from the container chamber, a conduit for conducting fluid from above the filtering member to the chamber below the filtering wall while excluding the fluid from the filtering wall, whereby the fluid may pass upwardly around and outside the filtered wall, said conduit being of substantially less area than the chamber, and means for taking off from the interior of the filtering member at its bottom filtered fluid which has passed from outside the filtered wall therethrough into the interior of said filtering member.

13. In a strainer, a container having a chamber, a filtering member in said chamber formed with a substantially vertical filtering wall spaced substantially above the bottom of said chamber and separating the interior of the filtering member from the chamber, said wall being positioned substantially centrally in the chamber and being uniformly surrounded by the chamber, a plurality of conduits each of less area than the chamber each serving to conduct fluid from above the filtering member to the chamber below the filtering wall while excluding the fluid from the filtering wall, and means for taking off filtered fluid from the interior of said filtering member and at its bottom of the filter member.

14. In a strainer, a container having a chamber, a hopper, a filtering member in said chamber formed with a substantially vertical filtering wall spaced substantially above the bottom of said chamber and separating the interior of the filtering member from the chamber, said wall being surrounded by the chamber, a plurality of conduits each of less area than the chamber and each extending from said hopper and from above the filtering member to the chamber below the filtering wall to conduct fluid from the hopper below the wall in independent streams while excluding the fluid from the filtering wall, the filtering member having top and bottom walls closing the interior of the member from the chamber, said chamber extending upwardly around the filtering member and above the same, and means for taking off filtered fluid from the interior of said filtering member and at the bottom.

15. A strainer comprising a container having a chamber provided with a normally closed bottom, a filtering member in said chamber spaced above said bottom and having a filtering side wall, and top and bottom walls closing the interior thereof from the chamber, a plurality of conduits each of substantially less area than the chamber each extending from above the filtering member to the chamber below the same and directed toward the bottom of the chamber whereby to conduct entering fluid from above the filtering member to the chamber while excluding the same from the filtering wall, said chamber extending upwardly around said filtering wall and being of substantially uniform dimensions around said wall to permit the fluid to rise upwardly around the wall after leaving the conduits, and means for taking off the filtered fluid from the interior of the filtering member below the filtering wall.

In testimony whereof I have hereunto set my hand.

WALLACE M. DILLON.